United States Patent
Wang et al.

(10) Patent No.: US 11,316,631 B2
(45) Date of Patent: Apr. 26, 2022

(54) TIME-FREQUENCY RESOURCE ALLOCATION METHOD AND APPARATUS FOR ACCESS SIGNAL AND COMMUNICATION SYSTEM

(71) Applicant: FUJITSU LIMITED, Kawasaki (JP)

(72) Inventors: Weiwei Wang, Beijing (CN); Hua Zhou, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 123 days.

(21) Appl. No.: 16/260,534

(22) Filed: Jan. 29, 2019

(65) Prior Publication Data
US 2019/0173638 A1    Jun. 6, 2019

Related U.S. Application Data

(63) Continuation of application No. PCT/CN2016/094690, filed on Aug. 11, 2016.

(51) Int. Cl.
*H04W 72/12*     (2009.01)
*H04L 5/00*      (2006.01)
(Continued)

(52) U.S. Cl.
CPC .......... *H04L 5/0044* (2013.01); *H04L 5/0048* (2013.01); *H04L 5/0094* (2013.01);
(Continued)

(58) Field of Classification Search
CPC . H04L 5/0044; H04L 5/0048; H04L 27/2602; H04L 5/0094; H04L 27/2605;
(Continued)

(56) References Cited

U.S. PATENT DOCUMENTS 9,820,281 B1 * 11/2017 Werner ............... H04W 72/042
10,136,379 B2  11/2018 Liu et al.
(Continued)

FOREIGN PATENT DOCUMENTS

CN      105530685 A    4/2016
CN      105744591 A    7/2016
(Continued)

OTHER PUBLICATIONS

Samsung, Proposed set of numerologies for NR, 3GPP TSG RAN WG1 #85 R1-163998 Nanjing, China May 23-27, 2016 (Year: 2016).*

(Continued)

*Primary Examiner* — Mounir Moutaouakil
(74) *Attorney, Agent, or Firm* — Myers Wolin, LLC

(57) ABSTRACT

Embodiments of this disclosure provide a time-frequency resource allocation method and apparatus for an access signal and a communication system. The method includes: a base station indicates, via control signaling and/or a broadcast message, a position of a time-frequency resource for transmitting an access signal, the access signal is transmitted via common numerologies or via different numerologies or via one numerology. With the method and apparatus or the system of the embodiments of this disclosure, cell access may be achieved when a user supports different numerologies.

13 Claims, 7 Drawing Sheets

(51) Int. Cl.
  *H04L 27/26* (2006.01)
  *H04W 48/08* (2009.01)
  *H04W 48/16* (2009.01)
  *H04W 72/04* (2009.01)

(52) U.S. Cl.
  CPC ...... *H04L 27/2602* (2013.01); *H04L 27/2605* (2013.01); *H04W 48/08* (2013.01); *H04W 48/16* (2013.01); *H04W 72/0446* (2013.01); *H04W 72/0453* (2013.01); *H04L 5/0005* (2013.01)

(58) Field of Classification Search
  CPC .... H04L 5/0005; H04L 5/0053; H04W 48/08; H04W 48/16; H04W 72/0446; H04W 72/0453; H04W 48/12
  See application file for complete search history.

(56) References Cited

U.S. PATENT DOCUMENTS

| | | |
|---|---|---|
| 2013/0195069 A1 | 8/2013 | Frederiksen et al. |
| 2013/0201921 A1 | 8/2013 | Chen et al. |
| 2017/0201968 A1* | 7/2017 | Nam ............... H04W 72/042 |
| 2017/0245165 A1* | 8/2017 | Onggosanusi ........ H04W 24/08 |
| 2017/0310431 A1* | 10/2017 | Iyer ................. H04L 1/1816 |
| 2017/0332359 A1* | 11/2017 | Tsai ................. H04B 7/0639 |
| 2017/0339718 A1 | 11/2017 | Liu et al. |
| 2017/0366311 A1* | 12/2017 | Iyer ................. H04L 5/0007 |
| 2017/0367030 A1 | 12/2017 | Liu et al. |
| 2019/0013982 A1* | 1/2019 | Sun ................. H04L 1/1854 |
| 2019/0109695 A1* | 4/2019 | Kim ................. H04L 27/2613 |
| 2019/0150132 A1* | 5/2019 | Bala ................. H04W 72/042 370/329 |
| 2019/0268205 A1* | 8/2019 | Shin ................. H04L 27/2666 |
| 2020/0344034 A1* | 10/2020 | Moon ................. H04L 5/0051 |

FOREIGN PATENT DOCUMENTS

| | | |
|---|---|---|
| JP | 2010-4505 A | 1/2010 |
| WO | 2016/004900 A1 | 1/2016 |
| WO | 2016/004901 A1 | 1/2016 |
| WO | 2016/072216 A1 | 5/2016 |

OTHER PUBLICATIONS

Notification of Reasons for Refusal issued by the Japan Patent Office for corresponding Japanese Patent Application No. 2019-505420, dated Dec. 10, 2019, with an English translation.

LG Electronics, "Support different numerology and different usage scenarios", Agenda Item: 7.1.4, 3GPP TSG-RAN WG1 Meeting #85, R1-164561, Nanjing, China, May 23-27, 2016.

Mediatek Inc., "General considerations on NB-IOT DL physical layer design", Agenda Item: 6.2.6.2.2, 3GPP TSG-RAN WG1 Meeting #83, R1-156972, Anaheim, USA, Nov. 15-22, 2015.

Qualcomm Incorporated, "Increased number of MBSFN subframes per radio frame", Agenda Item: 6.2.5.2, 3GPP TSG-RAN WG1 Meeting #85, R1-164440, Nanjing, China, May 23-27, 2016.

First Notification of Office Action and search report issued by Chine National Intellectual Property Administration dated Sep. 3, 2020 for corresponding Chinese patent application No. 201680087744.9, with an English translation.

International Search Report issued by the State Intellectual Property Office of the P.R. China for corresponding International Patent Application No. PCT/CN2016/094690, dated Apr. 28, 2017, with an English translation.

Written Opinion of the International Searching Authority issued by the State Intellectual Property Office of the P.R. China for corresponding International Patent Application No. PCT/CN2016/094690, dated Apr. 28, 2017, with an English translation.

Second Notification of Office Action issued by the China National Intellectual Property Administration for corresponding Chinese Patent Application No. 201680087744.9, dated Apr. 26, 2021, with an English translation.

Notice of Reasons for Refusal by issued the Japan Patent Office for corresponding Japanese Patent Application No. 2020-073939 dated May 18, 2021, with an English translation.

Decision of Rejection issued by the China National Intellectual Property Administration for corresponding Chinese Patent Application No. 201680087744.9, dated Dec. 9, 2021, with an English translation.

\* cited by examiner

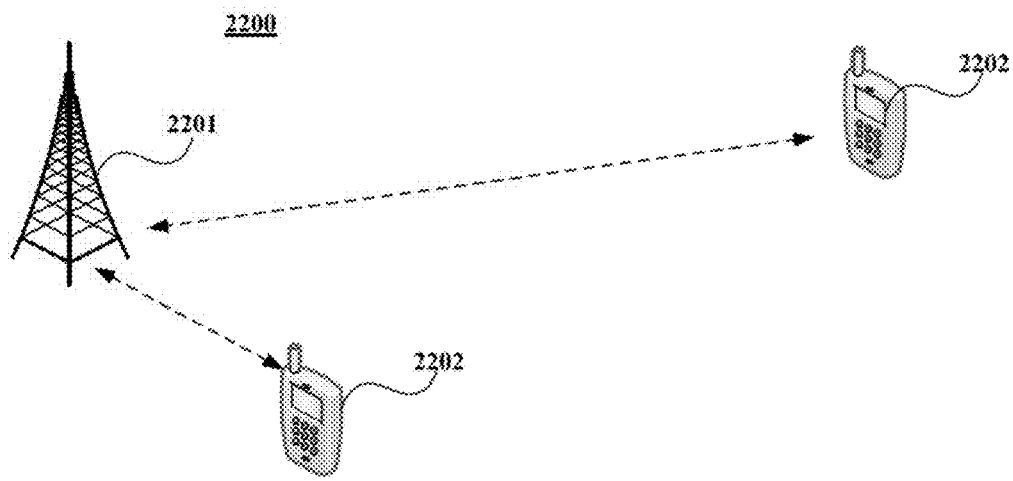
Fig.22
the base station transmits unfrequently changed information and frequently changed information via broadcast messages, the frequently changed information being used to indicate information on an allocated time-frequency resource or a range of time-frequency resources used to transmit control signaling or an access signal
Fig.23
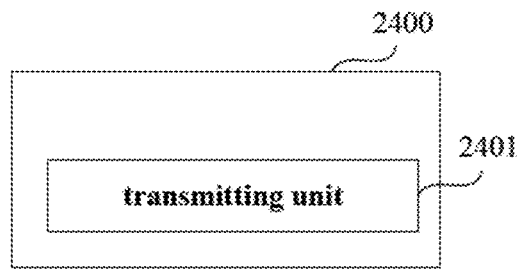
Fig.24

TIME-FREQUENCY RESOURCE ALLOCATION METHOD AND APPARATUS FOR ACCESS SIGNAL AND COMMUNICATION SYSTEM

CROSS REFERENCE TO RELATED APPLICATIONS

This application is a continuation application of International Application PCT/CN2016/094690 filed on Aug. 11, 2016, the entire contents of which are incorporated herein by reference.

FIELD

This disclosure relates to the field of communication technologies, and in particular to a time-frequency resource allocation method and apparatus for an access signal and a communication system.

BACKGROUND

A new radio (NR) system supports three scenarios: enhanced mobile bandwidth, extra large-scale device access, and low-latency and high-reliability communication. In order to be adapted to characteristics of different scenarios, different numerologies may possibly be used to transmit user data. For access to a cell, each user needs to perform a cell access procedure.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in a long term evolution (LTE) system/long term evolution advanced (LTE-A) system, a cell access procedure is designed based on an assumption that users support common numerologies. However, in a future radio access system, it is possible that each user supports different numerologies due to different scenarios. And existing schemes are unable to be applicable to cases where users support different numerologies.

Embodiments of this disclosure provide a time-frequency resource allocation method and apparatus for an access signal and a communication system, in which cell access may be achieved when a user support different numerologies.

According to a first aspect of the embodiments of this disclosure, there is provided a time-frequency resource allocation method for an access signal, applicable to a base station, the method including:

indicating by the base station, via control signaling and/or a broadcast message, a position of a time-frequency resource for transmitting an access signal, the access signal being transmitted via common numerologies or via different numerologies or via one numerology.

According to a second aspect of the embodiments of this disclosure, there is provided a time-frequency resource determination method for an access signal, applicable to user equipment, the method including:

receiving control signaling and/or a broadcast message by the user equipment; and determining a position of a time-frequency resource for transmitting an access signal by the user equipment according to the control signaling and/or the broadcast message;

wherein, the access signal is transmitted via common numerologies or via different numerologies or via one numerology.

According to a third aspect of the embodiments of this disclosure, there is provided a time-frequency resource allocation apparatus for an access signal, configured in a base station, the apparatus including:

a transmitting unit configured to indicate, via control signaling and/or a broadcast message, a position of a time-frequency resource for transmitting an access signal, the access signal being transmitted via common numerologies or via different numerologies or via one numerology.

According to a fourth aspect of the embodiments of this disclosure, there is provided a time-frequency resource determination apparatus for an access signal, configured in user equipment, the apparatus including:

a receiving unit configured to receive control signaling and/or a broadcast message; and a determining unit configured to determine a position of a time-frequency resource for transmitting an access signal according to the control signaling and/or the broadcast message;

wherein, the access signal is transmitted via common numerologies or via different numerologies or via one numerology.

According to a fifth aspect of the embodiments of this disclosure, there is provided a base station, including the apparatus as described in the third aspect.

According to a sixth aspect of the embodiments of this disclosure, there is provided user equipment, including the apparatus as described in the fourth aspect.

According to a seventh aspect of the embodiments of this disclosure, there is provided a communication system, including a base station and user equipment; wherein, the base station includes the apparatus as described in the third aspect, and the user equipment includes the apparatus as described in the fourth aspect.

An advantage of the embodiments of this disclosure exists in that with the method, the apparatus or the system of the embodiments of this disclosure, cell access may be achieved when a user supports different numerologies.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 22 is a schematic diagram of the communication system of Embodiment 5;

FIG. 23 is a schematic diagram of the method for transmitting a broadcast message of Embodiment 6; and FIG. 24 is a schematic diagram of the apparatus for transmitting a broadcast message of Embodiment 6.

DETAILED DESCRIPTION

Figure 1:
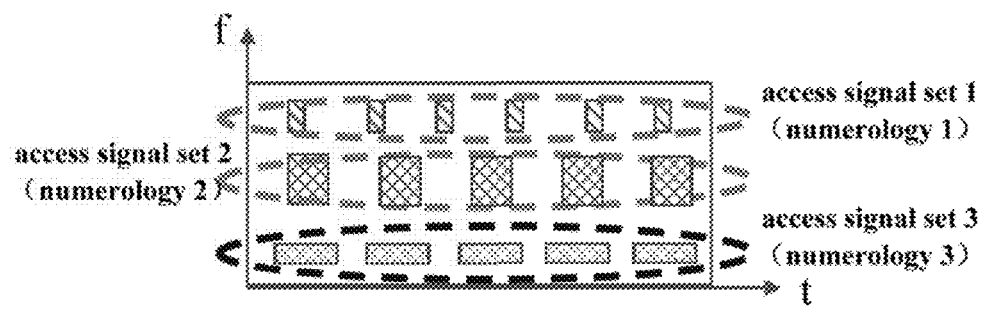
FIG. 1 is a schematic diagram of using different numerologies by different access signal sets.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of this disclosure shall be described below with reference to the accompanying drawings. Such embodiments are illustrative only, and are intended to limit this disclosure.

In this disclosure, a base station may be referred to as an access point, a broadcast transmitter, a node B, or an evolution node B (base station), etc., and may include some or all functions thereof. A term "base station" shall be used in the text, and each base station provides communication coverage for a specific geographical region. A term "cell" may refer to a base station and/or its coverage region, depending on a context where the term is used.

In this disclosure, a mobile station or equipment may be referred to as user equipment (UE). The UE may be fixed or mobile, and may also be referred to as a mobile station, a terminal, an access terminal, a user unit, a station, or a user etc. The UE may be a cellular phone, a personal digital assistant (PDA), a wireless modem, a wireless communication device, a handhold device, a lap-top computer, a cordless telephone, and a vehicle, etc.

Several concepts concerned in this application shall be explained below first.

Access signal set: containing a set of signals that a user needs to receive in access to a cell, such as a synchronization signal, a system message, and a message related to random access.

Numerology: used to denote a group of parameters of a wireless signal, such as a subcarrier interval, a cyclic prefix length, and a symbol length.

In an LTE/LTE-A system, all users have identical access signal sets, and signals in this set may be divided into two types:

Type-1 signal: this type of signal is transmitted on a predefined fixed time-frequency resource, such as primary synchronization signal (PSS)/secondary synchronization signal (SSS)/master information block (MIB) in the LTE/LTE-A system;

Type-2 signal: this type of signal contains some messages related to cell access, such as system messages (SIB1, SIB2, etc.), and messages related to random access, which is transmitted on variable time-frequency resources. Time-frequency resources carrying such signal is indicated by control signaling transmitted on a physical control channel.

During a cell access procedure, the user first receives the Type-1 signal, and then, based on information obtained from the Type-1 signal, may obtain a range of time-frequency resources for receiving control signaling, that is, the user needs to obtain required control signaling within the range. This control signaling may include a location of the time-frequency resource carrying the Type-2 signal. And after receiving the Type-2 signal, the user is accessed to the cell.

In a new wireless (NR) system, signals in a access signal set that a user needs to receive in access to a cell are also divided into two types, namely, Type-1 signal and Type-2 signal. Different from the LTE/LTE-A system, the NR system may possibly contain a plurality of access signal sets, and different signal sets contain signals necessary for different users in access to the cell. Table 1 gives an example.

TABLE 1

| Access signal set 1 | Access signal set 2 | Access signal set 3 |
| --- | --- | --- |
| User 1 | User 2 | User 3 |

As shown in Table 1, user 1 corresponds to access signal set 1, that is, access signal set 1 contains signals that user 1 needs in access to the cell. And likewise, access signal set 2 contains signals that user 2 needs in access to the cell, and access signal set 3 contains signals that user 3 needs in access to the cell.

Furthermore, in NR system, the above three access signal sets may also be the same, that is, the user uses the same access signal set.

Moreover, for numerologies used to transmit the signals in these access signal sets, there exists the following cases.

Case 1: signals in different access signal sets are transmitted by using different numerologies.

FIG. 1 is a schematic diagram of case 1. As shown in FIG. 1, the signals in access signal set 1 are transmitted by using numerology 1, the signals in access signal set 2 are transmitted by using numerology 2, and the signals in access signal set 3 are transmitted by using numerology 3.

Case 2: for different access signal sets, some of the signals in each access signal sets are transmitted by using common numerologies, while other signals in each access signal set 2 are transmitted by using different numerologies.

Figure 2:
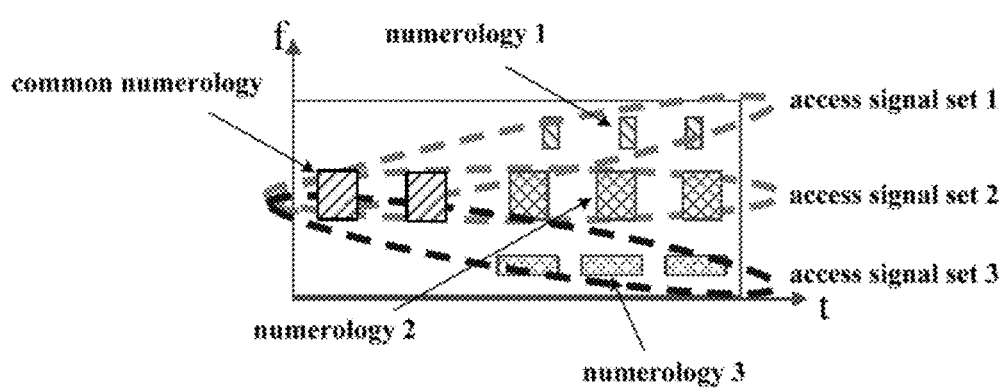
FIG. 2 is a schematic diagram of using common numerologies and different numerologies by different access signal sets.

FIG. 2 is a schematic diagram of case 2. As shown in FIG. 2, for access signal set 1, a part of signals therein are transmitted by using common numerologies, and the other part of the signals are transmitted by using numerology 1; for access signal set 2, a part of the signals are transmitted by using common numerologies, and the other part of the signals are transmitted by using numerology 2; and for access signal set 3, a part of the signals are transmitted by using common numerologies, and the other part of the signals are transmitted by using numerology 3.

In case 2, the common numerologies may be the same as numerology 1 or numerology 2 or numerology 3, or may be different from numerology 1, numerology 2 and numerology 3.

Case 3: signals in all the access signal sets are transmitted via common numerologies.

Figure 3:
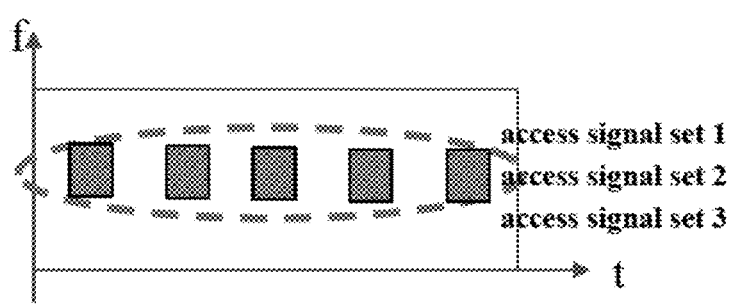
FIG. 3 is a schematic diagram of using common numerologies by different access signal sets.

FIG. 3 is a schematic diagram of case 3. As shown in FIG. 3, the signals in access signal set 1, the signals in access signal set 2 and the signals in access signal set 3 are all transmitted via common numerologies.

Figure 4:
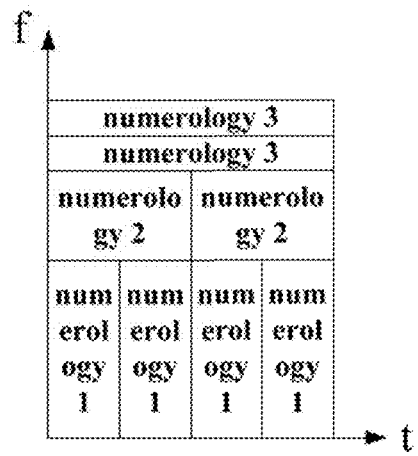
FIG. 4 is a schematic diagram of multiplexing a plurality of numerologies in the same bandwidth.

In an embodiment of this disclosure, it is assumed that the NR system supports a plurality of different numerologies, and signals having different numerologies may be multiplexed within the same system bandwidth. FIG. 4 is a schematic diagram of multiplexing a plurality of numerologies within the same system bandwidth. As shown in FIG. 4, numerologies used by signals transmitted at different frequencies and at the same time may be different, and numerologies used by signals transmitted at the same frequency and at different times may be different. Different numerologies are illustrated in FIG. 4 in different shapes.

The embodiments of this disclosure shall be described below with reference to the accompanying drawings.

Embodiment 1

Figure 5:
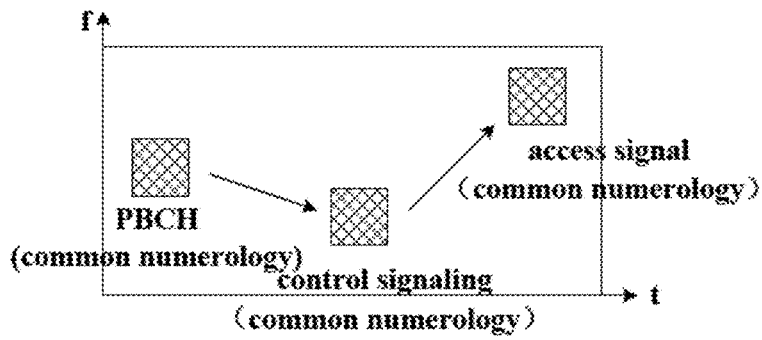
FIG. 5 is a schematic diagram of the time-frequency resource allocation method for an access signal of Embodiment 1.

This embodiment provides a time-frequency resource allocation method for an access signal, applicable to a base station, such as a base station in an NR system. FIG. 5 is a schematic diagram of the method of this embodiment. As shown in FIG. 5, the method includes:

step 501: the base station indicates, via control signaling and/or a broadcast message, a position of a time-frequency resource for transmitting an access signal, the access signal being transmitted via common numerologies or via different numerologies or via one numerology.

In this embodiment, the access signal is transmitted via common numerologies, the "common" here referring to that numerologies used by access signals from different access signal sets are common, and the access signal is transmitted via different numerologies, the "different" here referring to that numerologies used by access signals from different access signal sets are different. And if there is only one access signal set, the access signal is transmitted via one numerology.

With the method of this embodiment, after receiving the control signaling or the broadcast message, the user equipment may obtain the access signal according to the position of the time-frequency resource for transmitting the access signal indicated by the control signaling or broadcast message, thereby accessing to the cell. Moreover, as the access signal is transmitted via above-described common numerologies or via above-described different numerologies, cell access may be achieved when the user supports different numerologies.

In this embodiment, the position of the time-frequency resource for transmitting the access signal is indicated by the control signaling or broadcast message. However, this embodiment is not limited thereto; and in other embodiments, the position of the time-frequency resource for transmitting the access signal may also be predefined or pre-configured and is fixed. The "pre-defined" here refers to pre-writing in a standard, being understood by both a base station and user equipment, and being executed accordingly. The "pre-configured" here refers to being pre-configured and fixed during an initialization procedure or before a cell access procedure. Reference may be made to the related art for particular meanings of "pre-defined" and "pre-configured", and in this embodiment, like technological terms have like meanings.

In this embodiment, the access signal may be one or more, and as described above, the access signal is located in a access signal set, and different access signal sets may respectively use different numerologies (as shown in FIG. 1), or a part thereof use common numerologies and the other part use different numerologies (as shown in FIG. 2). And the access signal may be the aforementioned Type-2 signal, however, this embodiment is not limited thereto.

In this embodiment, the base station is a serving base station of the user equipment, which may be, as described above, a macro base station (such as an eNB), and a macro cell generated by the macro base station may provide services for the user equipment; or it may also be a pico base station, and a pico cell generated by the pico base station may provide services for the user equipment; or it may be other serving base stations. This disclosure is not limited thereto, and a particular scenario may be determined as actually demanded.

In this embodiment, the user equipment is user equipment served by the above base station, which may be any one of the above UE, and the embodiment of this disclosure is not limited thereto.

In one implementation, the base station indicates, via the control signaling, the position of the time-frequency resource for transmitting the access signal, the control signaling being transmitted in a predefined or preconfigured time-frequency resource or a range of time-frequency resources. The control signaling here is, for example, control signaling carried in a common search space in a physical downlink control channel (PDCCH) in an LTE/LTE-A system, and a bandwidth indicated by the range of time-frequency resources here may be smaller than a system bandwidth.

In this implementation, information carried in the control signaling may be slightly different according to numerologies used by the control signaling and the numerologies used by the access signal, which shall be described below for different cases.

If the control signaling is transmitted via common numerologies and the access signal is transmitted via common numerologies, the information carried in the control signaling contains information for deriving a position of an allocated time-frequency resource used to transmit the access signal, and alternatively, it may further contain information indicating numerologies used to transmit the access signal.

If the control signaling is transmitted via common numerologies and the access signal is transmitted via different numerologies, the information carried in the control signaling contains information for deriving a position of an allocated time-frequency resource used to transmit the access signal and information indicating numerologies used to transmit the access signal.

If the control signaling is transmitted via different numerologies and the access signal is transmitted via common numerologies, the information carried in the control signaling contains information for deriving a position of an allocated time-frequency resource used to transmit the access signal, and alternatively, it may further contain information indicating numerologies used to transmit the access signal.

If the control signaling is transmitted via different numerologies and the access signal is transmitted via different numerologies, the information carried in the control signaling contains information for deriving a position of an allocated time-frequency resource used to transmit the access signal, and alternatively, it may further contain information indicating numerologies used to transmit the access signal.

In this implementation, the control signaling is transmitted via common numerologies, the "common" here referring to that numerologies used by control signaling used for indicating time-frequency resources of access signals in different access signal sets are common. And likewise, the control signaling is transmitted via different numerologies, the "different" here referring to that numerologies used by control signaling used for indicating time-frequency resources of access signals in different access signal sets are different.

That is, in this implementation, if the access signal uses different numerologies and the control signaling uses common numerologies, the control signaling contains not only the information indicating a position of a time-frequency resource used to transmit the access signal, but also contains the information indicating numerologies used by the access signal, and in other cases, the information indicating numerologies used by the access signal is optional.

In another implementation, the base station indicates, via the control signaling, the position of the time-frequency resource for transmitting the access signal. Different from the former implementation, in this implementation, the control signaling is transmitted in the allocated time-frequency resource or range of time-frequency resources. And in this implementation, the base station needs further to indicate, via the broadcast message, the time-frequency resource or range of time-frequency resources used for transmitting the control signaling.

In this implementation, similar to the former implementation, the control signaling is, for example, control signaling carried in a common search space in a PDCCH in an LTE/LTE-A system, and a bandwidth indicated by the range of time-frequency resources may be smaller than a system bandwidth.

In this implementation, the broadcast message is a message transmitted in a physical broadcast channel (PBCH), such as an MIB message in an LTE system, which may be fixed always, or may be periodically changed or dynamically changed (i.e. aperiodically changed).

In this implementation, the information contained in the broadcast message and the control signaling is also slightly different depending on the numerologies used by the broadcast message, the numerologies used by the control signaling and the numerologies used by the access signal, which shall be described below for different cases.

Figure 6:
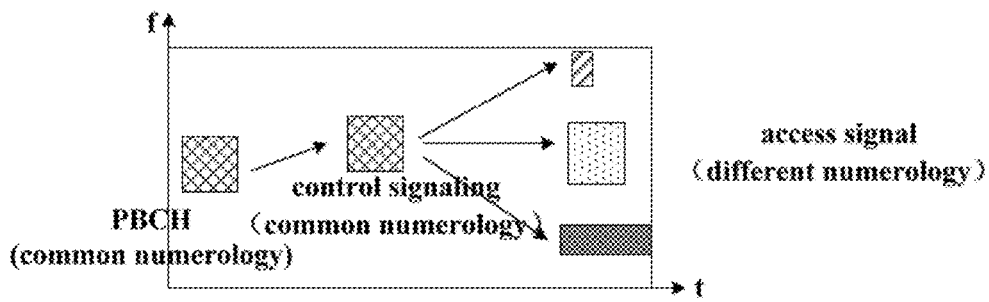
FIG. 6 is a schematic diagram of numerologies respectively used by a broadcast message, control signaling and an access signal.

If the broadcast message is transmitted via common numerologies, the control signaling is transmitted via common numerologies and the access signal is transmitted via common numerologies, as shown in FIG. 6, the broadcast message may include: information for deriving a position or a range of allocated time-frequency resources used to transmit the control signaling, and the control signaling may include: information for deriving a position of an allocated time-frequency resource used to transmit the access signal. And alternatively, the broadcast message may further include: information for indicating a numerology used to transmit the control signaling, and the control signaling may further include: information for indicating a numerology used to transmit the access signal.

Figure 7:
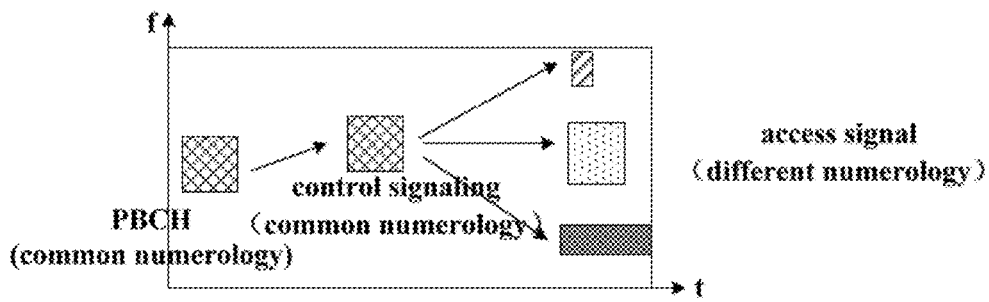
FIG. 7 is anther schematic diagram of the numerologies respectively used by the broadcast message, control signaling and access signal.

If the broadcast message is transmitted via common numerologies, the control signaling is transmitted via common numerologies and the access signal is transmitted by using different numerologies, as shown in FIG. 7, the broadcast message may include: information for deriving a position or a range of allocated time-frequency resources used to transmit the control signaling, and the control signaling may include: information for deriving a position of an allocated time-frequency resource used to transmit the access signal and information for indicating a numerology used to transmit the access signal. And alternatively, the broadcast message may further include: information for indicating a numerology used to transmit the control signaling.

Figure 8:
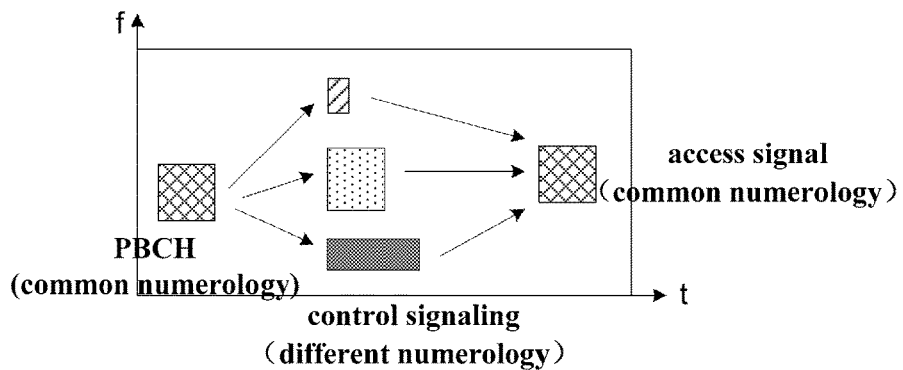
FIG. 8 is a further schematic diagram of the numerologies respectively used by the broadcast message, control signaling and access signal.

If the broadcast message is transmitted via common numerologies, the control signaling is transmitted via different numerologies and the access signal is transmitted via common numerologies, as shown in FIG. 8, the broadcast message may include: information for deriving a position or a range of allocated time-frequency resources used to transmit the control signaling and information for indicating a numerology used to transmit the control signaling, and the control signaling may include: information for deriving a position of an allocated time-frequency resource used to transmit the access signal. And alternatively, the control signaling may further include: information for indicating a numerology used to transmit the access signal.

Figure 9:
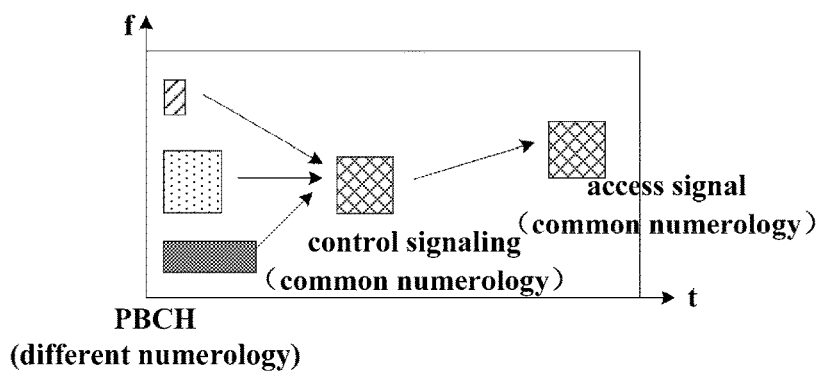
FIG. 9 is yet another schematic diagram of the numerologies respectively used by the broadcast message, control signaling and access signal.

If the broadcast message is transmitted via different numerologies, the control signaling is transmitted via common numerologies and the access signal is transmitted via common numerologies, as shown in FIG. 9, the broadcast message may include: information for deriving a position or a range of allocated time-frequency resources used to transmit the control signaling, and the control signaling may include: information for deriving a position of an allocated time-frequency resource used to transmit the access signal. And alternatively, the broadcast message may further include: information for indicating a numerology used to transmit the control signaling, and the control signaling may further include: information for indicating a numerology used to transmit the access signal.

Figure 10:
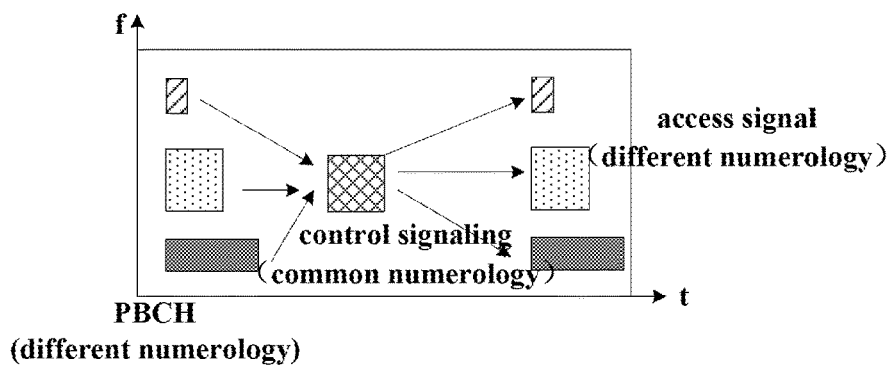
FIG. 10 is still another schematic diagram of the numerologies respectively used by the broadcast message, control signaling and access signal.

If the broadcast message is transmitted by using different numerologies, the control signaling is transmitted via common numerologies and the access signal is transmitted via different numerologies, as shown in FIG. 10, the broadcast message may include: information for deriving a position or a range of time-frequency resources used to transmit the control signaling, and the control signaling may include: information for deriving a position of an allocated time-frequency resource used to transmit the access signal and information for indicating a numerology used to transmit the access signal. And alternatively, the broadcast message may further include: information for indicating a numerology for transmitting the control signaling.

Figure 11:
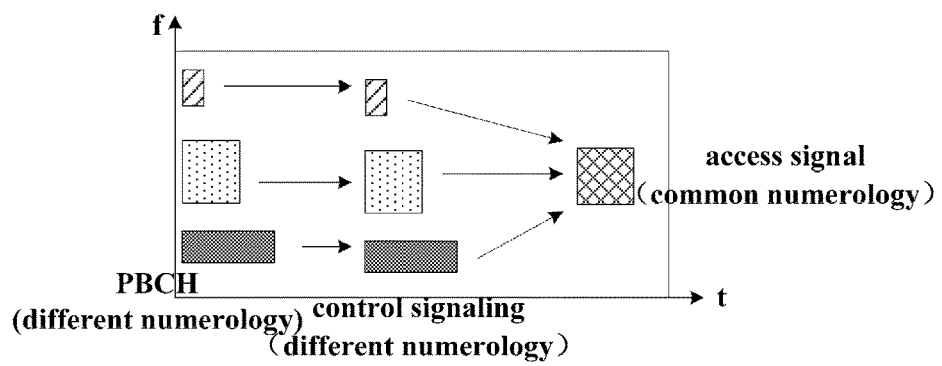
FIG. 11 is further still another schematic diagram of the numerologies respectively used by the broadcast message, control signaling and access signal.

If the broadcast message is transmitted via different numerologies, the control signaling is transmitted via different numerologies and the access signal is transmitted by using common numerologies, as shown in FIG. 11, the broadcast message may include: information for deriving a position or a range of allocated time-frequency resources used to transmit the control signaling, and the control signaling may include: information for deriving a position of an allocated time-frequency resource used to transmit the access signal. And alternatively, the broadcast message may further include: information for indicating a numerology used to transmit the control signaling, and the control signaling may further include: information for indicating a numerology used to transmit the access signal.

Figure 12:
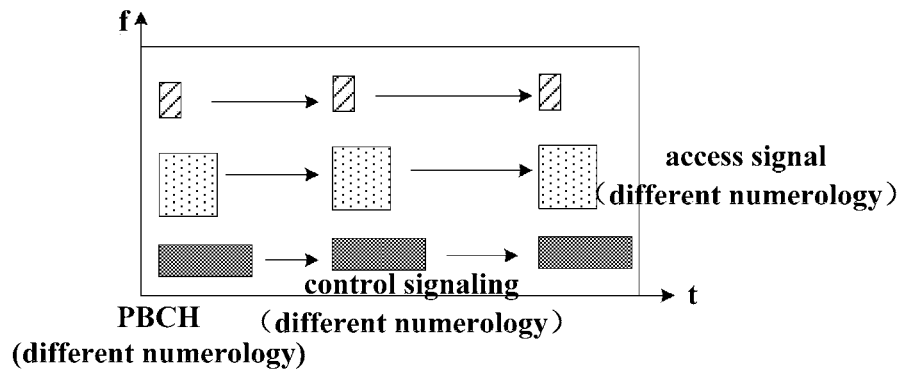
FIG. 12 is yet still another schematic diagram of the numerologies respectively used by the broadcast message, control signaling and access signal.

If the broadcast message is transmitted via different numerologies, the control signaling is transmitted via different numerologies and the access signal is transmitted via different numerologies, as shown in FIG. 12, the broadcast message may include: information for deriving a position or a range of allocated time-frequency resources used to transmit the control signaling, and the control signaling may include: information for deriving a position of an allocated time-frequency resource used to transmit the access signal. And alternatively, the broadcast message may further include: information for indicating a numerology used to transmit the control signaling, and the control signaling may further include: information for indicating a numerology used to transmit the access signal.

In this implementation, the broadcast message is transmitted via common numerologies, the "common" here referring to that numerologies used by broadcast messages belonging to different access signal sets are common. Likewise, the broadcast message is transmitted via different numerologies, the "different" here referring to that numerologies used by broadcast messages belonging to different access signal sets are different. In this implementation, meanings of "the control signaling is transmitted via common numerologies" and "the control signaling is transmitted via different numerologies" are identical to those in the former implementations, which shall not be described herein any further.

That is, in this implementation, if the access signal uses different numerologies and the control signaling uses common numerologies, the control signaling contains not only the information indicating a position of a time-frequency resource used to transmit the access signal, but also contains the information indicating numerologies used by the access signal; and if the control signaling uses different numerologies and the broadcast message uses common numerologies, the broadcast message contains not only the information indicating a position or range of time-frequency resources used to transmit the control signaling, but also contains the information indicating numerologies used by the control signaling; and in other cases, the information indicating numerologies used by the control signaling or the information indicating numerologies used by the access signal is optional.

In a further implementation, the base station indicates, via the broadcast message, the position of the time-frequency resource for transmitting the access signal. Different from the above two implementations, in this implementation, the base station indicates, via the broadcast message directly, the position of the time-frequency resource for transmitting the access signal.

In this implementation, the information carried in the broadcast message is also slightly different depending on the numerologies used by the broadcast message and the numerologies used by the access signal, which shall be described below for different cases.

Figure 13:
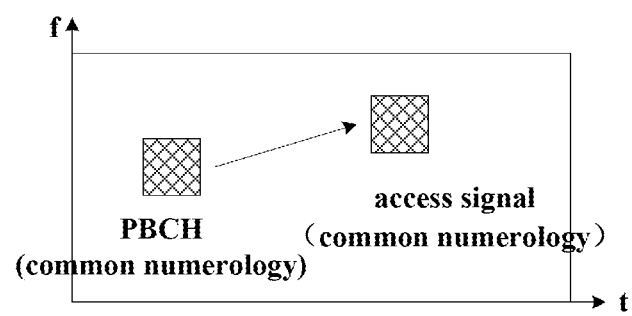
FIG. 13 is a schematic diagram of numerologies respectively used by a broadcast message and an access signal.

If the broadcast message is transmitted via common numerologies and the access signal is transmitted via common numerologies, as shown in FIG. 13, the broadcast message may include: information for deriving a position of an allocated time-frequency resource used to transmit the access signal. And alternatively, the broadcast message may further include: information for indicating a numerology used to transmit the access signal.

Figure 14:
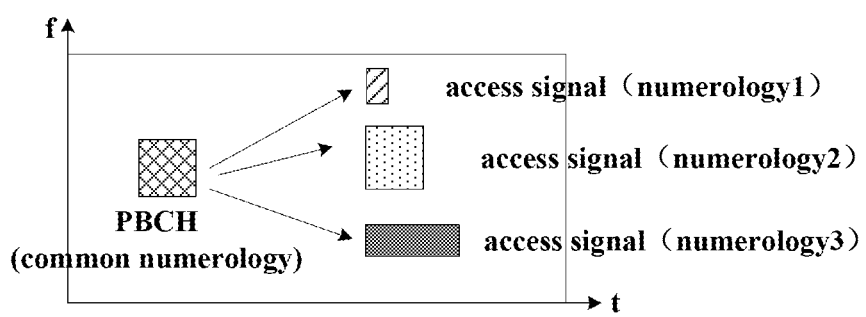
FIG. 14 is another schematic diagram of the numerologies respectively used by the broadcast message and access signal.

If the broadcast message is transmitted via common numerologies and the access signal is transmitted via different numerologies, as shown in FIG. 14, the broadcast message may include: information for deriving a position of an allocated time-frequency resource used to transmit the access signal and information for indicating a numerology used to transmit the access signal.

Figure 15:
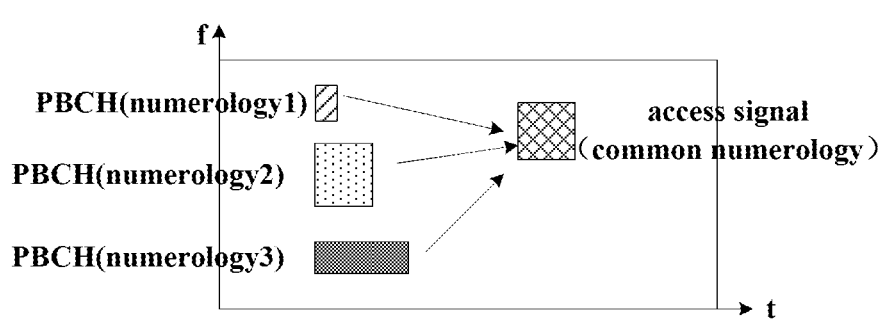
FIG. 15 is a further schematic diagram of the numerologies respectively used by the broadcast message and access signal.

If the broadcast message is transmitted via different numerologies and the access signal is transmitted via common numerologies, as shown in FIG. 15, the broadcast message may include: information for deriving a position of an allocated time-frequency resource used to transmit the access signal. And alternatively, the broadcast message may further include: information for indicating a numerology used to transmit the access signal.

Figure 16:
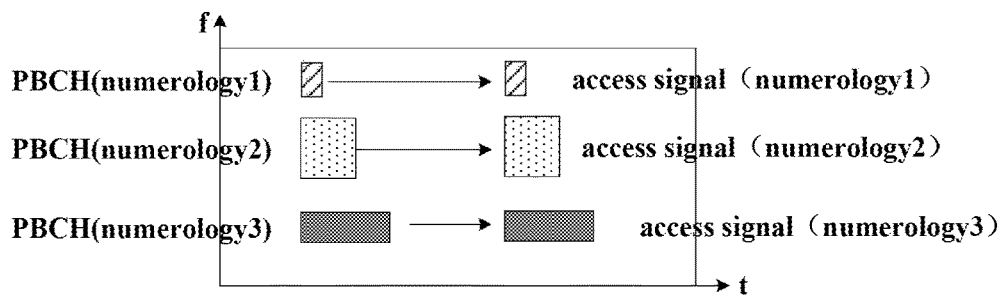
FIG. 16 is yet another schematic diagram of the numerologies respectively used by the broadcast message and access signal.

If the broadcast message is transmitted via different numerologies and the access signal is transmitted via different numerologies, as shown in FIG. 16, the broadcast message may include: information for deriving a position of an allocated time-frequency resource used to transmit the access signal. And alternatively, the broadcast message may further include: information for indicating a numerology used to transmit the access signal.

In this embodiment, meanings of "the broadcast message is transmitted via common numerologies" and "the broadcast message is transmitted via different numerologies" are identical to those in the above implementations, which shall not be described herein any further.

In this implementation, the broadcast message is a message transmitted in a physical broadcast channel (PBCH), such as an MIB message in an LTE system, which may be fixed always, or may be periodically changed or dynamically changed (i.e. aperiodically changed).

In this embodiment, the broadcast message may include two types of information, one type is unfrequently changed information, such as bandwidth information, which may be denoted by information type 1; and the other type is frequently changed information, such as information indicating resources allocated for transmitting some messages, e.g. the information for deriving a position or a range of allocated time-frequency resources used to transmit the control signaling described above, and the information for indicating a position of a time-frequency resource for receiving the access signal described above, etc., which may be denoted by information type 2.

In one implementation of this embodiment, the information type 1 and the information type 2 may be transmitted in the same broadcast message. The broadcast messages may be transmitted periodically, and contents of the broadcast messages may be periodically changed, or may be dynamically changed, i.e. aperiodically changed.

In another implementation of this embodiment, the information type 1 and the information type 2 may be transmitted in different broadcast messages. The broadcast messages used for transmitting information type 1 may be transmitted periodically, and contents of thereof may be slightly changed, or may be changed in a long period (such as several minutes). And the broadcast messages used for transmitting information type 2 may be transmitted periodically, or may be dynamically transmitted, i.e. transmitted aperiodically, and contents of thereof may be changed in a relatively small period, or may be dynamically changed (aperiodically changed).

In a further implementation of this embodiment, at some moments (a first time period), the information type 1 and the information type 2 may be transmitted in the same broadcast message, and at some other moments (a second time period), the broadcast messages transmit only the information type 1 or the information type 2. In this implementation, the broadcast messages may be transmitted periodically or may be transmitted dynamically (transmit aperiodically), and the contents thereof may be periodically changed or dynamically changed (aperiodically changed).

In this embodiment, the time-frequency resource for transmitting the broadcast messages may be predefined or pre-configured, or may be indicated by other access signals. That is, after the user receives some access signals, it may obtain the information indicating the position of the time-frequency resource used to transmit the broadcast messages.

The time-frequency resource allocation method for an access signal of the embodiment of this disclosure is described above by way of different implementations. In the above description, the time-frequency resource or the range of time-frequency resources is described. In this embodiment, if the information on a time-domain position of an allocated resource or a range of resources has been pre-defined or pre-configured or has been indicated in a received signal, the time-frequency resource or range of time-frequency resources refers to information on a frequency-domain position of the allocated resource or range of resources. Likewise, if the information on the frequency-domain position of the allocated resource or range of resources has been pre-defined or pre-configured or has been indicated in a received signal, the time-frequency resource or range of time-frequency resources refers to information on a time-domain position of the allocated resource or range of resources. Similarly, if both the information on the time-domain position and the information on the frequency-domain position are not pre-defined or pre-configured, the time-frequency resource or range of time-frequency resources refers to information on the time-domain position and the information on the frequency-domain position of the allocated resource or range of resources.

With the method of this embodiment, the base station indicates, via the control signaling and/or the broadcast message, the position of the time-frequency resource for transmitting the access signal, and after receiving the control signaling and/or the broadcast message, the user equipment may obtain the access signal according to the position of the time-frequency resource for transmitting the access signal indicated by the control signaling and/or the broadcast message, thereby accessing to the cell. Moreover, as the access signal is transmitted via the common numerologies described above or via the different numerologies described above, cell access may be achieved when the user supports different numerologies.

Embodiment 2

This embodiment provides a time-frequency resource determination method for an access signal, applicable to user equipment, such as user equipment in an NR system. This method is processing at a user equipment side corresponding to the method of Embodiment 1, with contents identical to those in Embodiment 1 being not going to be described herein any further.

Figure 17:
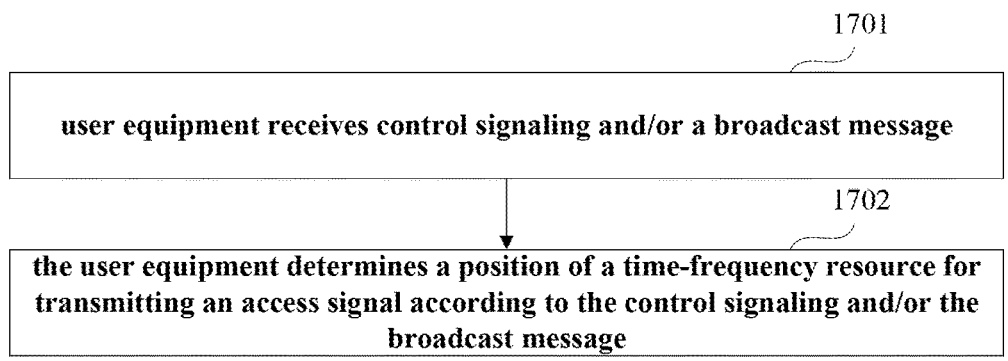
FIG. 17 is a schematic diagram of the time-frequency resource determination method for an access signal of Embodiment 2.

FIG. 17 is a schematic diagram of an implementation of the method of this embodiment. As shown in FIG. 17, the method includes:

step 1701: the user equipment receives control signaling and/or a broadcast message; and step 1702: the user equipment determines a position of a time-frequency resource for transmitting an access signal according to the control signaling and/or the broadcast message.

In this embodiment, the access signal is transmitted via common numerologies or via different numerologies or via one numerology, with meanings being identical to those in Embodiment 1, which shall not be described herein any further.

In this embodiment, methods for transmitting the control signaling and the broadcast message, and the information contained therein have been described in Embodiment 1, the contents of which being incorporated herein, which shall not be described herein any further.

With the method of this embodiment, after receiving the control signaling and/or the broadcast message from the base station, the user equipment may obtain the access signal according to the position of the time-frequency resource for transmitting the access signal indicated by the control signaling and/or the broadcast message, thereby accessing to the cell. Moreover, as the access signal is transmitted via the common numerologies described above or via the different common numerologies described above, cell access may be achieved when the user supports different numerologies.

Embodiment 3

This embodiment provides a time-frequency resource allocation apparatus for an access signal, configured in a base station, such as a base station in an NR system. As principles of the apparatus are similar to that of the method in Embodiment 1, the implementation of the method in Embodiment 1 may be referred to for implementation of the apparatus, with identical contents being not going to be described herein any further.

Figure 18:
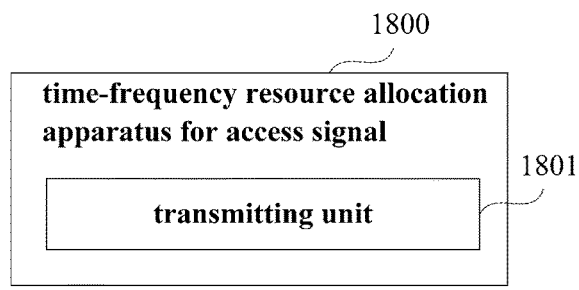
FIG. 18 is a schematic diagram of the time-frequency resource allocation apparatus for an access signal of Embodiment 3.

FIG. 18 is a schematic diagram of the apparatus of this embodiment. As shown in FIG. 18, a time-frequency resource allocation apparatus for an access signal apparatus 1800 includes: a transmitting unit 1801 configured to indicate, via control signaling and/or a broadcast message, a position of a time-frequency resource for transmitting an access signal, the access signal being transmitted via common numerologies or via different numerologies or via one numerology.

In this embodiment, meanings of the access signal being transmitted via common numerologies and the access signal being transmitted via different numerologies are identical to those in Embodiment 1, which shall not be described herein any further.

In one implementation of this embodiment, the transmitting unit 1801 indicates, via the control signaling, the position of the time-frequency resource for transmitting the access signal, and the control signaling is transmitted in a predefined or preconfigured time-frequency resource or a range of time-frequency resources.

In this implementation, if the control signaling is transmitted via common numerologies and the access signal is transmitted via common numerologies, or if the control signaling is transmitted via different numerologies and the access signal is transmitted via common numerologies, or if the control signaling is transmitted via different numerologies and the access signal is transmitted via different numerologies, the control signaling transmitted by the transmitting unit 1801 includes: information for deriving a position of an allocated time-frequency resource used to transmit the access signal. And alternatively, the control signaling transmitted by the transmitting unit 1801 may further include: information for indicating a numerology used to transmit the access signal.

In this implementation, if the control signaling is transmitted via common numerologies and the access signal is transmitted via different numerologies, the control signaling transmitted by the transmitting unit 1801 includes: information for deriving a position of an allocated time-frequency resource used to transmit the access signal and information for indicating a numerology used to transmit the access signal.

In another implementation of this embodiment, the transmitting unit 1801 indicates, via the control signaling, the position of the time-frequency resource for transmitting the access signal, and the control signaling is transmitted in an allocated time-frequency resource or a range of time-frequency resources, and the transmitting unit 1801 further indicates, via a broadcast message, the time-frequency resource or the range of time-frequency resources for transmitting the control signaling.

In this implementation, if the broadcast message is transmitted via common numerologies, the control signaling is transmitted via common numerologies and the access signal is transmitted via common numerologies, or if the broadcast message is transmitted via different numerologies, the control signaling is transmitted via common numerologies and the access signal is transmitted via common numerologies, or if the broadcast message is transmitted via different numerologies, the control signaling is transmitted via different numerologies and the access signal is transmitted by using common numerologies, or if the broadcast message is transmitted via different numerologies, the control signaling is transmitted via different numerologies and the access signal is transmitted via different numerologies, the broadcast message transmitted by the transmitting unit 1801 includes: information for deriving a position or a range of allocated time-frequency resources used to transmit the control signaling, and the control signaling transmitted by the transmitting unit includes: information for deriving a position of an allocated time-frequency resource used to transmit the access signal. And alternatively, the broadcast message transmitted by the transmitting unit 1801 may further include: information for indicating a numerology used to transmit the control signaling, and the control signaling transmitted by the transmitting unit 1801 may further include: information for indicating a numerology used to transmit the access signal.

In this implementation, if the broadcast message is transmitted via common numerologies, the control signaling is transmitted via common numerologies and the access signal is transmitted by using different numerologies, or if the broadcast message is transmitted by using different numerologies, the control signaling is transmitted via common numerologies and the access signal is transmitted via different numerologies, the broadcast message transmitted by the transmitting unit 1801 includes: information for deriving a position or a range of allocated time-frequency resources used to transmit the control signaling, and the control signaling transmitted by the transmitting unit 1801 includes: information for deriving a position of an allocated time-frequency resource used to transmit the access signal and information for indicating a numerology used to transmit the access signal. And alternatively, the broadcast message transmitted by the transmitting unit 1801 may further include: information for indicating a numerology for transmitting the control signaling.

In this implementation, if the broadcast message is transmitted via common numerologies, the control signaling is transmitted via different numerologies and the access signal is transmitted via common numerologies, the broadcast message transmitted by the transmitting unit 1801 includes: information for deriving a position or a range of allocated time-frequency resources used to transmit the control signaling and information for indicating a numerology used to transmit the control signaling, and the control signaling transmitted by the transmitting unit 1801 includes: information for deriving a position of an allocated time-frequency resource used to transmit the access signal. And alternatively, the control signaling transmitted by the transmitting unit 1801 may further include: information for indicating a numerology used to transmit the access signal.

In a further implementation of this embodiment, the transmitting unit 1801 indicates, via the broadcast message directly, the position of the time-frequency resource for transmitting the access signal In this implementation, if the broadcast message is transmitted via common numerologies and the access signal is transmitted via common numerologies, or if the broadcast message is transmitted via different numerologies and the access signal is transmitted via common numerologies, or if the broadcast message is transmitted via different numerologies and the access signal is transmitted via different numerologies, the broadcast message transmitted by the transmitting unit 1801 includes: information for deriving a position of an allocated time-frequency resource used to transmit the access signal. And alternatively, the broadcast message transmitted by the transmitting unit 1801 may further include: information for indicating a numerology used to transmit the access signal.

In this implementation, if the broadcast message is transmitted via common numerologies and the access signal is transmitted via different numerologies, the broadcast message transmitted by the transmitting unit 1801 includes: information for deriving a position of an allocated time-frequency resource used to transmit the access signal and information for indicating a numerology used to transmit the access signal.

In this embodiment, meanings of "the control signaling is transmitted via common numerologies" and "the control signaling is transmitted via different numerologies" are identical to those in Embodiment 1, and meanings of "the broadcast message is transmitted via common numerologies" and "the broadcast message is transmitted via different numerologies" are also identical to those in Embodiment 1, which shall not be described herein any further.

In this embodiment, the above broadcast message includes unfrequently changed information and frequently changed information.

In one implementation, the transmitting unit 1801 periodically or aperiodically transmits the unfrequently changed information and the frequently changed information via same broadcast message.

In another implementation, the transmitting unit 1801 transmits the unfrequently changed information and the frequently changed information via different broadcast messages, and the transmitting unit 1801 periodically transmits the unfrequently changed information via a first broadcast message, and periodically or aperiodically transmits the frequently changed information via a second broadcast message.

In a further implementation, the transmitting unit 1801 periodically or aperiodically transmits the unfrequently changed information and the frequently changed information via same broadcast message at a first period of time, and periodically or aperiodically transmits the unfrequently changed information or the frequently changed information at a second period of time.

With the apparatus of this embodiment, in transmitting the control signaling and/or the broadcast message to the user equipment, the base station indicates, via the control signaling and/or the broadcast message, the position of the time-frequency resource for transmitting the access signal, and after receiving the control signaling and/or the broadcast message, the user equipment may obtain the access signal, thereby accessing to the cell. As the access signal is transmitted via the common numerologies described above or via the different common numerologies described above, cell access may be achieved when the user supports different numerologies.

This embodiment further provides a base station, configured with the time-frequency resource allocation apparatus 1800 for an access signal.

Figure 19:
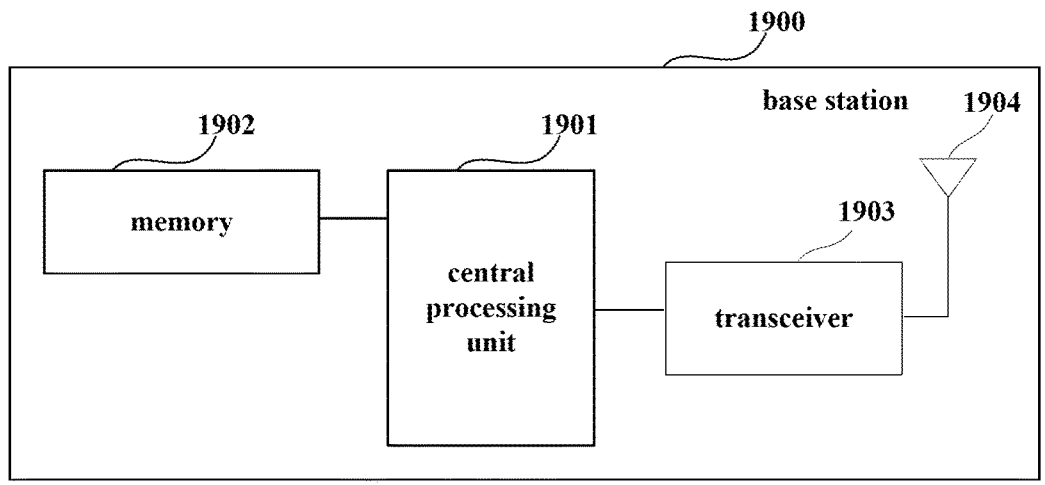
FIG. 19 is a schematic diagram of the base station of Embodiment 3.

FIG. 19 is a schematic diagram of a structure of the base station of the embodiment of this disclosure. As shown in FIG. 19, a base station 1900 may include a central processing unit (CPU) 1901 and a memory 1902, the memory 1902 being coupled to the central processing unit 1901. In this embodiment, the memory 1901 may store various data, and furthermore, it may store a program for information processing, and execute the program under control of the central processing unit 1901, so as to receive various information transmitted by user equipment, and transmit various information to the user equipment.

In one implementation, the functions of the apparatus 1800 may be integrated into the central processing unit 1901. In this embodiment, the central processing unit 1901 may be configured to carry out the method described in Embodiment 1.

For example, the central processing unit 1901 may be configured to: indicate, via control signaling and/or a broadcast message, a position of a time-frequency resource for transmitting an access signal, the access signal being transmitted via common numerologies or via different numerologies or via one numerology.

In another implementation, the apparatus 1800 and the central processing unit 1901 may be configured separately. For example, the apparatus 1800 may be configured as a chip connected to the central processing unit 1901, with its functions being carried out under control of the central processing unit 1901.

Furthermore, as shown in FIG. 19, the base station 1900 may further include a transceiver 1903, and an antenna 1904, etc. In this embodiment, functions of the above components are similar to those in the related art, and shall not be described herein any further. It should be noted that the base station 1900 does not necessarily include all the parts shown in FIG. 19, and furthermore, the base station 1900 may include parts not shown in FIG. 19, and the related art may be referred to.

With the base station of this embodiment, the position of the time-frequency resource for transmitting the access signal is indicated via the control signaling and/or the broadcast message, and after receiving the control signaling and/or the broadcast message, the user equipment may obtain the access signal, thereby accessing to the cell. As the access signal is transmitted via the common numerologies described above or via the different common numerologies described above, cell access may be achieved when the user supports different numerologies.

Embodiment 4

This embodiment provides a time-frequency resource determination apparatus for an access signal, configured in user equipment, such as user equipment configured in an NR system. As principles of the apparatus are similar to that of the method in Embodiment 2, the implementation of the method in Embodiment 2 may be referred to for implementation of the apparatus, with identical contents being not going to be described herein any further.

Figure 20:
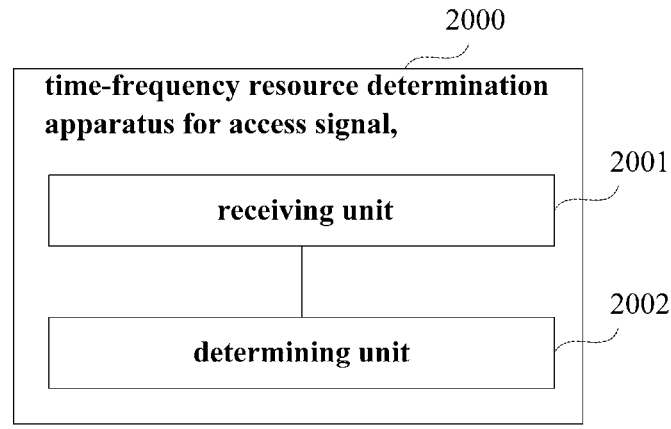
FIG. 20 is a schematic diagram of the time-frequency resource determination apparatus for an access signal of Embodiment 4.

FIG. 20 is a schematic diagram of the apparatus of this embodiment. As shown in FIG. 20, a time-frequency resource determination apparatus for an access signal 2000 includes: a receiving unit 2001 and a determining unit 2002. The receiving unit 2001 is configured to receive control signaling and/or a broadcast message, and the determining unit 2002 is configured to determine a position of a time-frequency resource for transmitting an access signal according to the control signaling and/or the broadcast message.

In this embodiment, the access signal is transmitted via common numerologies or via different numerologies or via one numerology. In this embodiment, meanings of "the access signal is transmitted via common numerologies" and "the access signal is transmitted via different numerologies" are identical to those in Embodiment 1, which shall not be described herein any further.

With the apparatus of this embodiment, the user equipment may access to the cell. And as the access signal is transmitted via the common numerologies described above or via the different common numerologies described above, cell access may be achieved when the user supports different numerologies.

This embodiment further provides user equipment, configured with the apparatus 2000 described above.

Figure 21:
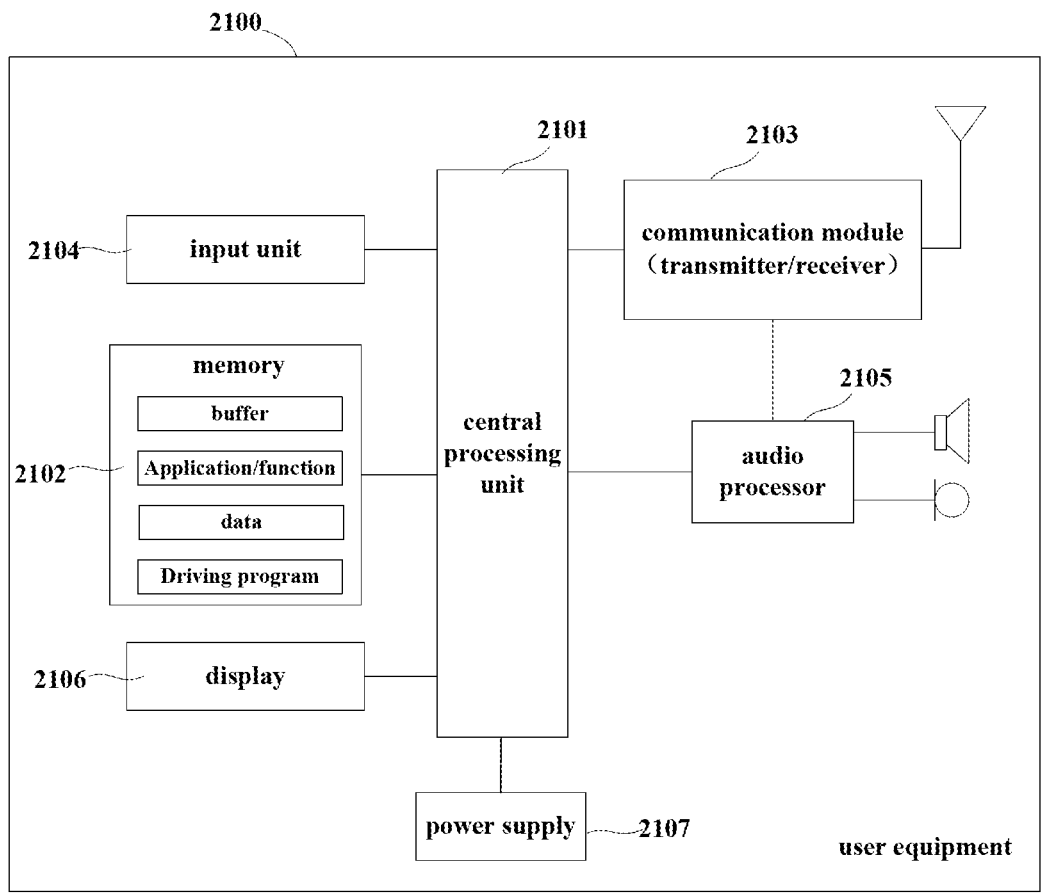
FIG. 21 is a schematic diagram of the user equipment of Embodiment 4.

FIG. 21 is a schematic diagram of a systematic structure of user equipment 2100 of the embodiment of this disclosure. As shown in FIG. 21, the user equipment 2100 may include a central processing unit 2101 and a memory 2102, the memory 2102 being coupled to the central processing unit 2101. It should be noted that this figure is illustrative only, and other types of structures may also be used, so as to supplement or replace this structure and achieve a telecommunications function or other functions.

In one implementation, the functions of the apparatus 2000 may be integrated into the central processing unit 2101. In this embodiment, the central processing unit 2101 may be configured to carry out the method described in Embodiment 2.

For example, the central processing unit 2101 may be configured to: receive control signaling and/or a broadcast message; and determine a position of a time-frequency resource for transmitting an access signal according to the control signaling and/or the broadcast message; wherein, the access signal is transmitted via common numerologies or via different numerologies or via one numerology.

In another implementation, the apparatus 2000 and the central processing unit 2101 may be configured separately. For example, the apparatus 2000 may be configured as a chip connected to the central processing unit 2101, with its functions being carried out under control of the central processing unit 2101.

As shown in FIG. 21, the user equipment 2100 may further include a communication module 2103, an input unit 2104, an audio processor 2105, a display 2106, and a power supply 2107. It should be noted that the user equipment 2100 does not necessarily include all the parts shown in FIG. 21, and furthermore, the user equipment 2100 may include parts not shown in FIG. 21, and the related art may be referred to.

As shown in FIG. 21, the central processing unit 2101 is sometimes referred to as a controller or control, which may include a microprocessor or other processor devices and/or logic devices, and the central processing unit 2101 receives input and controls operations of every component of the user equipment 2100.

In this embodiment, the memory 2102 may be, for example, one or more of a buffer memory, a flash memory, a hard drive, a mobile medium, a volatile memory, a nonvolatile memory, or other suitable devices, which may store various information, and furthermore, store programs executing related information. And the central processing unit 2101 may execute programs stored in the memory 2102, so as to realize information storage or processing, etc. Functions of other parts are similar to those of the related art, which shall not be described herein any further. The parts of the user equipment 2100 may be realized by specific hardware, firmware, software, or any combination thereof, without departing from the scope of this disclosure.

With the user equipment of this embodiment, it may access to the cell. And as the access signal is transmitted via the common numerologies described above or via the different common numerologies described above, cell access may be achieved when the user supports different numerologies.

Embodiment 5

This embodiment provides a communication system, including the base station described in Embodiment 3 and the user equipment described in Embodiment 4.

FIG. 22 is a schematic diagram of the communication system of the embodiment of this disclosure. As shown in FIG. 22, the communication system 2200 includes a base station 2201 and user equipment 2202; wherein, the base station 2201 may be the base station 1900 in Embodiment 3, and the user equipment 2202 may be the user equipment 2100 in Embodiment 4.

For example, the base station 2201 may be configured to: indicate, via control signaling and/or a broadcast message, a position of a time-frequency resource for transmitting an access signal; and the user equipment 2202 may be configured to: receive control signaling and/or a broadcast message, and determine a position of a time-frequency resource for transmitting an access signal according to the control signaling and/or the broadcast message; wherein, the access signal is transmitted via common numerologies or via different numerologies or via one numerology.

As the base station and the user equipment have been described in detail in the above embodiments, the contents of which are incorporated herein, which shall not be described herein any further.

With the communication system of this embodiment, cell access may be achieved when the user supports different numerologies.

An embodiment of the present disclosure provides a computer readable program, which, when executed in a time-frequency resource allocation apparatus for an access signal or a base station, will cause the apparatus or the base station to carry out the method described in Embodiment 1.

An embodiment of the present disclosure provides a computer storage medium, including a computer readable program, which will cause a time-frequency resource allocation apparatus for an access signal or a base station to carry out the method described in Embodiment 1.

An embodiment of the present disclosure provides a computer readable program, which, when executed in a time-frequency resource determination apparatus for an access signal or user equipment, will cause the apparatus or the user equipment to carry out the method described in Embodiment 2.

An embodiment of the present disclosure provides a computer storage medium, including a computer readable program, which will cause a time-frequency resource determination apparatus for an access signal or user equipment to carry out the method described in Embodiment 2.

Embodiment 6

This embodiment provides a method for transmitting a broadcast message, applicable to a base station in an NR system. FIG. 23 is a schematic diagram of the method of this embodiment. As shown in FIG. 23, the method includes:

step 2301: the base station transmits unfrequently changed information and frequently changed information via broadcast messages, the frequently changed information being used to indicate information on an allocated time-frequency resource or a range of time-frequency resources used to transmit control signaling or an access signal.

In an implementation of this embodiment, the unfrequently changed information and frequently changed information are transmitted via same broadcast message. The broadcast messages may be transmitted periodically, and contents of the broadcast messages may be periodically changed, or may be aperiodically changed.

In another implementation of this embodiment, the unfrequently changed information and frequently changed information are transmitted via different broadcast messages. The broadcast messages used for transmitting the unfrequently changed information are transmitted periodically, and contents of thereof may be slightly changed, or may be changed in a long period. And the broadcast messages used for transmitting the frequently changed information may be transmitted periodically, or may be transmitted aperiodically, and contents of thereof may be changed in a relatively small period or may be changed aperiodically.

In a further implementation of this embodiment, at a first time period, the unfrequently changed information and frequently changed information are transmitted via the same broadcast message, and at a second time period, the broadcast message transmits only the unfrequently changed information, or transmits only the frequently changed information. And the broadcast message is transmitted periodically, or is transmitted aperiodically, and contents of thereof may be changed periodically or aperiodically.

In this embodiment, the time-frequency resource for transmitting the broadcast messages are predefined or preconfigured, or are indicated by other access signals.

In this embodiment, as the broadcast messages have been described in detail in Embodiment 1, the contents of which are incorporated herein, which shall not be described herein any further.

This embodiment further provides an apparatus for transmitting a broadcast message, configured in a base station in an NR system. As principles of the apparatus are similar to that of the method shown in FIG. 23, with repeated contents being not going to be described herein any further. FIG. 24 is a schematic diagram of the apparatus. As shown in FIG. 24, an apparatus for transmitting a broadcast message 2400 includes: a transmitting unit 2401 configured to transmit unfrequently changed information and frequently changed information via broadcast messages, the frequently changed information being used to indicate information of an allocated time-frequency resource or a range of time-frequency resources used to transmit control signaling or an access signal.

This embodiment further provides a base station, including the apparatus 2400 for transmitting a broadcast message shown in FIG. 24. A hardware structure of the base station is similar to that shown in FIG. 19, which shall not be described herein any further.

With the method, apparatus and base station of this embodiment, the user equipment may be assisted in performing cell access.

Embodiment 7

This embodiment provides a time-frequency resource allocation method for an access signal. The method includes: determining a position of a time-frequency resource for transmitting an access signal; and predefining or preconfiguring the position of the time-frequency resource for transmitting the access signal. In this method, the position of the time-frequency resource for transmitting the access signal is predefined or preconfigured. And the access signal is transmitted via common numerologies or via different numerologies. Meanings of the common numerologies and the different numerologies are identical to those in Embodiment 1.

With the method of this method, cell access may be achieved when user equipment supports different numerologies.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory.

The method/apparatus described with reference to the embodiments of this disclosure may be directly embodied as hardware, software modules executed by a processor, or a combination thereof. For example, one or more functional block diagrams and/or one or more combinations (such as transmitting unit, receiving unit and determining unit) of the functional block diagrams shown in FIG. 18 or 20 or 24 may either correspond to software modules of procedures of a computer program, or correspond to hardware modules. Such software modules may respectively correspond to the steps shown in FIG. 5 or 17 or 23. And the hardware module, for example, may be carried out by firming the soft modules by using a field programmable gate array (FPGA).

The soft modules may be located in an RAM, a flash memory, an ROM, an EPROM, and an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the figures may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of this disclosure containing the above embodiments, following supplements are further disclosed.

Supplement 1. An apparatus for transmitting a broadcast message, including:

a transmitting unit configured to transmit unfrequently changed information and frequently changed information via broadcast messages, the frequently changed information being used to indicate information of an allocated time-frequency resource or a range of time-frequency resources used to transmit control signaling or an access signal.

Supplement 2. The apparatus according to supplement 1, wherein the unfrequently changed information and frequently changed information are transmitted via same broadcast message, the broadcast messages are transmitted periodically, and contents of the broadcast messages are periodically changed, or are aperiodically changed.

Supplement 3. The apparatus according to supplement 1, wherein the unfrequently changed information and frequently changed information are transmitted via different broadcast messages, the broadcast message used for transmitting the unfrequently changed information is transmitted periodically, and contents of the broadcast message are slightly changed, or are changed in a long period; and the broadcast message used for transmitting the frequently changed information is transmitted periodically, or is transmitted aperiodically, and contents of the broadcast message are changed in a relatively small period or are changed aperiodically.

Supplement 4. The apparatus according to supplement 1, wherein at a first time period, the unfrequently changed information and frequently changed information are transmitted via the same broadcast message, and at a second time period, the broadcast message transmits only the unfrequently changed information, or transmits only the frequently changed information; and the broadcast message is transmitted periodically, or is transmitted aperiodically, and contents of the broadcast message are changed periodically or changed aperiodically.

Supplement 5. The apparatus according to supplement 1, wherein the time-frequency resource for transmitting the broadcast message is predefined or pre-configured, or is indicated by an access signal.

Supplement 6. A time-frequency resource allocation method for an access signal, including:

determining a position of a time-frequency resource for transmitting an access signal; and predefining or preconfiguring the position of the time-frequency resource for transmitting the access signal;

wherein, the access signal is transmitted via common numerologies or via different numerologies or via one numerology.

What is claimed is:

1. A time-frequency resource allocation apparatus for an access signal, configured in a base station, the apparatus comprising:

a memory that stores a plurality of instructions;

processor circuitry that couples to the memory and that is configured to execute the instructions to:

indicate, via control signaling, a position of a time-frequency resource for transmitting an access signal, the access signal being transmitted via common numerologies or via different numerologies or via one numerology, wherein the access signal is a system message, and wherein the control signaling is transmitted in an allocated time-frequency resource or a range of time-frequency resources, and the processor circuitry further indicates, via a broadcast message, the time-frequency resource or the range of time-frequency resources for transmitting the control signaling, wherein,
if the broadcast message is transmitted via common numerologies, the control signaling is transmitted via common numerologies and the access signal is transmitted via common numerologies, or if the broadcast message is transmitted via different numerologies, the control signaling is transmitted via common numerologies and the access signal is transmitted via common numerologies, or if the broadcast message is transmitted via different numerologies, the control signaling is transmitted via different numerologies and the access signal is transmitted by using common numerologies, or if the broadcast message is transmitted via different numerologies, the control signaling is transmitted via different numerologies and the access signal is transmitted via different numerologies, the broadcast message transmitted by the processor circuitry comprises: information for deriving a position or a range of allocated time-frequency resources used to transmit the control signaling, and the control signaling transmitted by the processor circuitry comprises: information for deriving a position of an allocated time-frequency resource used to transmit the access signal.

2. The apparatus according to claim 1, wherein the broadcast message transmitted by the processor circuitry further comprises: information for indicating a numerology used to transmit the control signaling.

3. The apparatus according to claim 1, wherein the control signaling transmitted by the processor circuitry further comprises: information for indicating a numerology used to transmit the access signal.

4. The apparatus according to claim 1, wherein,
if the broadcast message is transmitted via common numerologies, the control signaling is transmitted via common numerologies and the access signal is transmitted by using different numerologies, or if the broadcast message is transmitted by using different numerologies, the control signaling is transmitted via common numerologies and the access signal is transmitted via different numerologies, the broadcast message transmitted by the processor circuitry comprises: information for deriving a position or a range of allocated time-frequency resources used to transmit the control signaling, and the control signaling transmitted by the processor circuitry comprises: information for deriving a position of an allocated time-frequency resource used to transmit the access signal and information for indicating a numerology used to transmit the access signal.

5. The apparatus according to claim 4, wherein the broadcast message transmitted by the processor circuitry further comprises: information for indicating a numerology for transmitting the control signaling.

6. The apparatus according to claim 1, wherein,
if the broadcast message is transmitted via common numerologies, the control signaling is transmitted via different numerologies and the access signal is transmitted via common numerologies,
the broadcast message transmitted by the processor circuitry comprises: information for deriving a position or a range of allocated time-frequency resources used to transmit the control signaling and information for indicating a numerology used to transmit the control signaling, and the control signaling transmitted by the processor circuitry comprises: information for deriving a position of an allocated time-frequency resource used to transmit the access signal.

7. The apparatus according to claim 6, wherein the control signaling transmitted by the processor circuitry further comprises: information for indicating a numerology used to transmit the access signal.

8. A time-frequency resource allocation apparatus for an access signal, configured in a base station, the apparatus comprising:
a memory that stores a plurality of instructions;
processor circuitry that couples to the memory and that is configured to execute the instructions to:
indicate, via a broadcast message, a position of a time-frequency resource for transmitting an access signal, the access signal being transmitted via common numerologies or via different numerologies or via one numerology,
wherein the access signal is a system message,
wherein,
if the broadcast message is transmitted via common numerologies and the access signal is transmitted via common numerologies,
or if the broadcast message is transmitted via different numerologies and the access signal is transmitted via common numerologies,
or if the broadcast message is transmitted via different numerologies and the access signal is transmitted via different numerologies,
the broadcast message transmitted by the processor circuitry comprises: information for deriving a position of an allocated time-frequency resource used to transmit the access signal.

9. The apparatus according to claim 8, wherein the broadcast message transmitted by the processor circuitry further comprises: information for indicating a numerology used to transmit the access signal.

10. The apparatus according to claim 8, wherein,
if the broadcast message is transmitted via common numerologies and the access signal is transmitted via different numerologies,
the broadcast message transmitted by the processor circuitry comprises: information for deriving a position of an allocated time-frequency resource used to transmit the access signal and information for indicating a numerology used to transmit the access signal.

11. The apparatus according to claim 8, wherein the broadcast message includes unfrequently changed information and frequently changed information, and the processor circuitry periodically or aperiodically transmits the unfrequently changed information and the frequently changed information via same broadcast message.

12. The apparatus according to claim 8, wherein the broadcast message includes unfrequently changed information and frequently changed information, the processor circuitry transmits the unfrequently changed information and the frequently changed information via different broadcast messages, and the processor circuitry periodically transmits the unfrequently changed information via a first broadcast message, and periodically or aperiodically transmits the frequently changed information via a second broadcast message.

13. The apparatus according to claim 8, wherein the broadcast message includes unfrequently changed information and frequently changed information, and the processor circuitry periodically or aperiodically transmits the unfrequently changed information and the frequently changed information via same broadcast message at a first period of time, and periodically or aperiodically transmits the unfrequently changed information or the frequently changed information at a second period of time.

* * * * *